United States Patent
Pandharipande et al.

(10) Patent No.: US 12,461,223 B2
(45) Date of Patent: Nov. 4, 2025

(54) SYSTEM AND METHODS FOR VEHICLE LOCALIZATION USING INFRASTRUCTURE SENSING

(71) Applicant: NXP B.V., Eindhoven (NL)

(72) Inventors: Ashish Pandharipande, Eindhoven (NL); Wilhelmus Johannes van Houtum, Sint-oedenrode (NL); Leendert Albertus Dick van den Broeke, Malden (NL); Paul Mattheijssen, Boxtel (NL)

(73) Assignee: NXP B.V., Eindhoven (NL)

( * ) Notice: Subject to any disclaimer, the term of this patent is extended or adjusted under 35 U.S.C. 154(b) by 294 days.

(21) Appl. No.: 17/950,360

(22) Filed: Sep. 22, 2022

(65) Prior Publication Data

US 2024/0103152 A1    Mar. 28, 2024

(51) Int. Cl.
    *G01S 13/58*    (2006.01)
    *G01S 13/62*    (2006.01)
    *G01S 13/931*   (2020.01)

(52) U.S. Cl.
    CPC .......... *G01S 13/582* (2013.01); *G01S 13/62* (2013.01); *G01S 13/931* (2013.01)

(58) Field of Classification Search
    CPC ...... G01S 13/582; G01S 13/62; G01S 13/931; G01S 2013/9316; G01S 7/006; G01S 13/42; G01S 13/58; G01S 13/584; G01S 13/89; G01S 13/589; G01S 13/72; G01S 13/87; G01S 13/526; G01S 13/538; G01S 13/50; G01S 13/878; G01S 13/46; G01S 19/48; G01S 7/412; G01S 13/865; G01S 13/867; G01S 13/876; G01S 17/89; G01S 13/90; G01S 2013/93273; G01S 17/931;
    (Continued)

(56) References Cited

U.S. PATENT DOCUMENTS

| | | | | |
|---|---|---|---|---|
| 3,299,425 A | * | 1/1967 | Smith | F41G 7/343 342/64 |
| 6,522,288 B1 | * | 2/2003 | Paradie | G01S 13/46 342/146 |

(Continued)

OTHER PUBLICATIONS

Busari, S. A., Khan, M. A., Huq, K. M. S., Mumtaz, S., & Rodriguez, J. (2019). Millimetre-wave massive MIMO for cellular vehicle-to-infrastructure communication. IET Intelligent Transport Systems, 13(6), 983â990. https://doi.org/10.1049/iet-its.2018.5492 (Year: 2019).*

(Continued)

*Primary Examiner* — Vladimir Magloire
*Assistant Examiner* — Remash R Guyah

(57) ABSTRACT

Radar localization systems and methods are provided to determine the location of an object. The radar localization systems and methods can determine the location of an object based on data obtained from at least two radar measurements made by the radar localization device. In some embodiments, a radar localization system can be included in a wireless communications system that conducts both wireless communications and radar sensing. Radar localization systems include at least a computing unit that performs a radar localization method. Radar localization methods may use map data in object localization to eliminate non-feasible locations of the object.

18 Claims, 6 Drawing Sheets

(58) Field of Classification Search
CPC .. G01S 7/023; G01S 13/588; G01S 2013/932; G01S 13/86; G01S 13/862; G01S 2013/9322; G01S 2013/93271; G01S 13/726; G01S 11/10; G01S 13/32; G01S 15/931; G01S 13/288; G01S 13/34; G01S 13/4454; G01S 13/4463; G01S 2013/0254; G01S 7/0232; G01S 7/0234; G01S 7/0235; G01S 7/497; G01S 2013/9323; G01S 2013/9324; G01C 21/32; G01C 21/3815; H04W 64/00; H04B 7/185; H04B 1/04; H04B 1/16; B60W 40/00; G05D 1/0214; G05D 1/0088; G05D 1/0223; B60Q 9/008; G08G 1/166; G08G 1/163; G08G 1/165
USPC ..... 342/70, 107, 109, 113, 147, 95, 96, 104, 342/115, 450, 451, 457, 357, 31, 357.34, 342/25, 28, 26, 139; 455/456.1; 701/408, 409, 516
See application file for complete search history.

(56) References Cited

U.S. PATENT DOCUMENTS

| | | | |
|---|---|---|---|
| 10,928,834 B2 | 2/2021 | Houts et al. | |
| 2013/0223686 A1* | 8/2013 | Shimizu | G06T 7/246 382/103 |
| 2017/0307746 A1* | 10/2017 | Rohani | G01S 13/865 |
| 2018/0087907 A1 | 3/2018 | DeBitetto et al. | |
| 2018/0120842 A1 | 5/2018 | Smith et al. | |
| 2020/0278440 A1* | 9/2020 | Wang | G01S 13/584 |
| 2021/0055734 A1 | 2/2021 | Yokev | |
| 2022/0065982 A1 | 3/2022 | Jernbacker | |
| 2022/0390597 A1* | 12/2022 | Wang | G01S 13/931 |

OTHER PUBLICATIONS

S.-W. Ko, H. Chae, K. Han, S. Lee, D.-W. Seo and K. Huang, "V2X-Based Vehicular Positioning: Opportunities, Challenges, and Future Directions," in IEEE Wireless Communications, vol. 28, No. 2, pp. 144-151, Apr. 2021, doi: 10.1109/MWC.001.2000259. (Year: 2021).*
Halili R, BniLam N, Yusuf M, Tanghe E, Joseph W, Weyn M, Berkvens R. âVehicle Localization Using Doppler Shift and Time of Arrival Measurements in a Tunnel Environment. Sensors (Basel)â. Jan. 22, 2022;22(3):847. doi: 10.3390/s22030847. PMID: 35161592; PMCID: PMC8839184. (Year: 2022).*
Tang, S., & Obana, S. (2018). Improving performance of pedestrian positioning by using vehicular communication signals. IET Intelligent Transport Systems, 12(5), 366â374. https://doi.org/10.1049/iet-its.2017.0134 (Year: 2018).*
Falcone, P., Colone, F., Macera, A., & Lombardo, P. (2014). Two-dimensional location of moving targets within local areas using WiFi-based multistatic passive radar. IET Radar, Sonar & Navigation, Suppl. Special Issue: Bistatic and MIMO Radars and their . . . , 8(2), 123-131. (Year: 2014).*
De Lima et al., "Convergent Communication, Sensing and Localization in 6G Systems: An Overview of Technologies, Opportunities and Challenges," IEEE (2021) vol. 9, pp. 26902-26925 [Digital Object Identifier 10.1109/Access.2021.3053486].
Wild et al., "Joint Design of Communication and Sensing for Beyond 5G and 6G Systems," IEEE (2021) vol. 9, pp. 30845-30857 [Digital Object Identifier 10.1109/Access.2021.3059488].
Wymeersch et al., "Cooperative Localization in Wireless Networks," IEEE (2009) vol. 97, No. 2, pp. 427-450 [Digital Object Identifier 10.1109/JPROC.2008.2008853].
European Patent Application No. EP21306455.3 filed with the European Patent Office on Oct. 18, 2021(50 pages).

* cited by examiner

SYSTEM AND METHODS FOR VEHICLE LOCALIZATION USING INFRASTRUCTURE SENSING

FIELD OF THE DISCLOSURE

The present disclosure relates to systems and methods for radar localization using radar, and more specifically radar localization systems and methods that include a single radar localization device that makes at least two radar measurements to determine the location of an object.

BACKGROUND OF THE DISCLOSURE

Modern wireless communication standards extend operating frequencies to millimeter (mm) wave frequencies. For example, some wireless communication systems may have operating frequencies of about 100 GHz. At such high frequencies, the wireless signals that are transmitted or received by communication systems may be used not only to perform wireless communications, but are also suitable for radar services/functionality, such as accurate range and velocity sensing.

With the capability to perform radar sensing, localization of objects in various environments has attracted recent attention in the cellular networks industry, particularly since the emergence of small cell base stations. Localization of moving objects, such as vehicles, for example, has remained an important problem with respect to various applications, such as navigation applications, autonomous driving systems, and enabling location-based services. Although various options are known for radar localization, such conventional options suffer from a number of disadvantages and inefficiencies.

Accordingly, it would be advantageous if new or improved systems and methods could be developed for achieving and optimizing systems and methods that perform radar localization.

BRIEF DESCRIPTION OF THE DRAWINGS

Specific examples have been chosen for purposes of illustration and description, and are shown in the accompanying drawings, forming a part of the specification.

Figure 1:
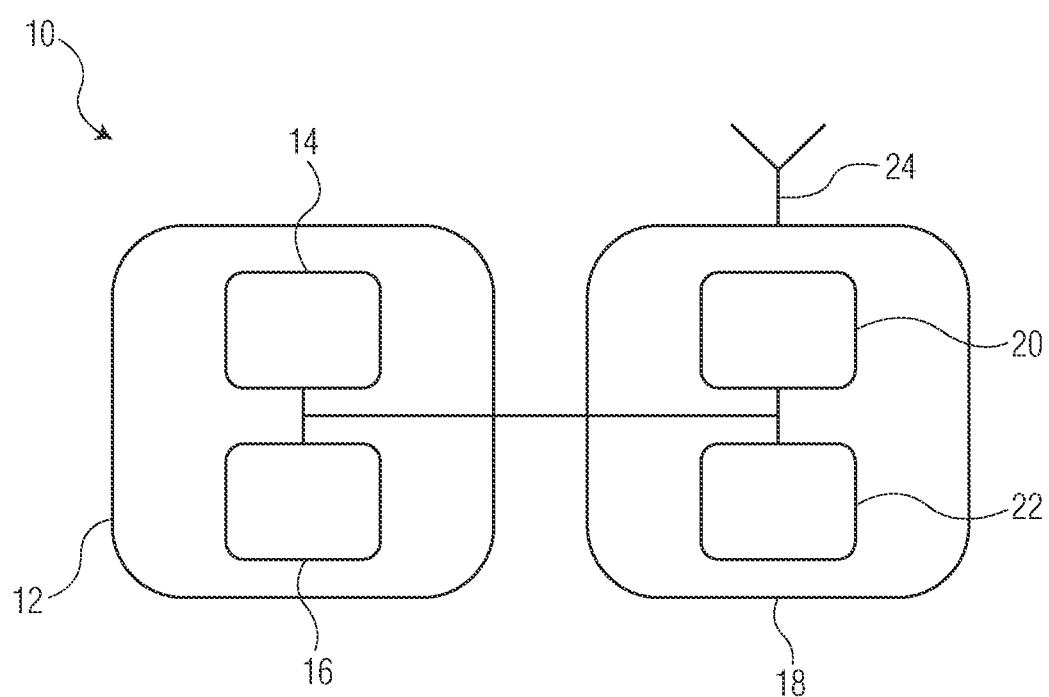
FIG. 1 is a block diagram of one embodiment of a radar localization system of the present technology.

While various embodiments discussed herein are amenable to modifications and alternative forms, aspects thereof have been shown by way of example in the drawings and are described in detail herein. It should be understood, however, that the disclosure is not limited to the particular embodiments described, and instead is meant to include all modifications, equivalents, and alternatives falling within the scope of the disclosure. In addition, the terms "example" and "embodiment" as used throughout this application are only by way of illustration, and not limitation, the Figures are not necessarily drawn to scale, and the use of the same reference symbols in different drawings indicates similar or identical items unless otherwise noted.

DETAILED DESCRIPTION

The present disclosure relates to radar localization systems and methods for radar localization using a single radar localization device. In at least some embodiments encompassed herein, the radar localization systems and methods may determine the location of an object based on data obtained from at least two radar measurements made by the radar localization device. The at least two radar measurements made by the radar localization device may be performed to derive range and velocity information. Also, in at least some embodiments encompassed herein, by using the derived radar information about an object, and using map data such as street geometry information, a feasible location of an object may be determined at least in part by discarding infeasible locations.

FIG. 1 illustrates one example of a radar localization system 10 of the present technology. The radar localization system 10 as shown includes at least one computing unit 12. The computing unit 12 incudes at least one processor 14, and at least one memory device 16 coupled at least indirectly to the at least one processor 14. The at least one memory device 16 is a non-volatile memory storage device that stores computer readable instructions that, when implemented by the at least one processor 12, cause the at least one processor 12 to perform radar localization using a method of the present technology (described more fully below). The computing unit 12 may be coupled at least indirectly to at least one radar sensor 18, or may be configured to be coupled at least indirectly to at least one radar sensor 18. As used herein, when two devices are "coupled at least indirectly," they are operatively connected in a manner that allows signals, such as data and/or other communications, to be transferred from at least one of the devices to the other device, such as by way of one or more communication links that may be wired or wireless communication links. The radar sensor 18 may be an antenna device that includes a transmitter 20, a receiver 22, and an antenna 24.

In practice, the at least one radar sensor 18 generates and transmits successive sets of electromagnetic beams outwardly from the radar sensor, and receives back sets of reflected sensing signals. A set of reflected sensing signals contains reflections of the electromagnetic beams that bounce back towards the radar sensor from environmental objects, which may be moving or stationary. Each set of reflected sensing signals that reflect off the environmental objects and are received by the at least one radar sensor 18 can constitute one radar measurement. The receiver 22 of the radar sensor provides data from each radar measurement to the computing unit 12, which uses the data to perform radar localization to determine the location of one or more environmental objects. When an environmental object is moving, the computing unit 12 may perform radar localization to determine the location of the environmental object using first data from a first radar measurement and second data from a second radar measurement.

In some embodiments, radar sensor 18 may be part of the radar localization system 10, as well as the at least one computing unit 12. In other embodiments, the radar sensor 18 may be provided as a separate component from the radar localization system 10.

Radar localization systems of the present technology may employ any suitable radar technology, such as, for example, phase-coded microwave waveform (PCMW) radar technology, Frequency-Modulated Continuous Wave (FMCW) radar, or orthogonal frequency division multiplexing (OFDM) radar technology. The radar technology may include for example radar technology that transmits or receives millimeter wave (mmWave) signals, such as signals having frequencies from approximately 30 Gigahertz (GHz) to 300 GHz, or microwave signals having frequencies above approximately 2.4 Gigahertz (GHz). The radar technology also in at least some embodiments may employ orthogonal frequency division multiplexing (OFDM).

Figure 2:
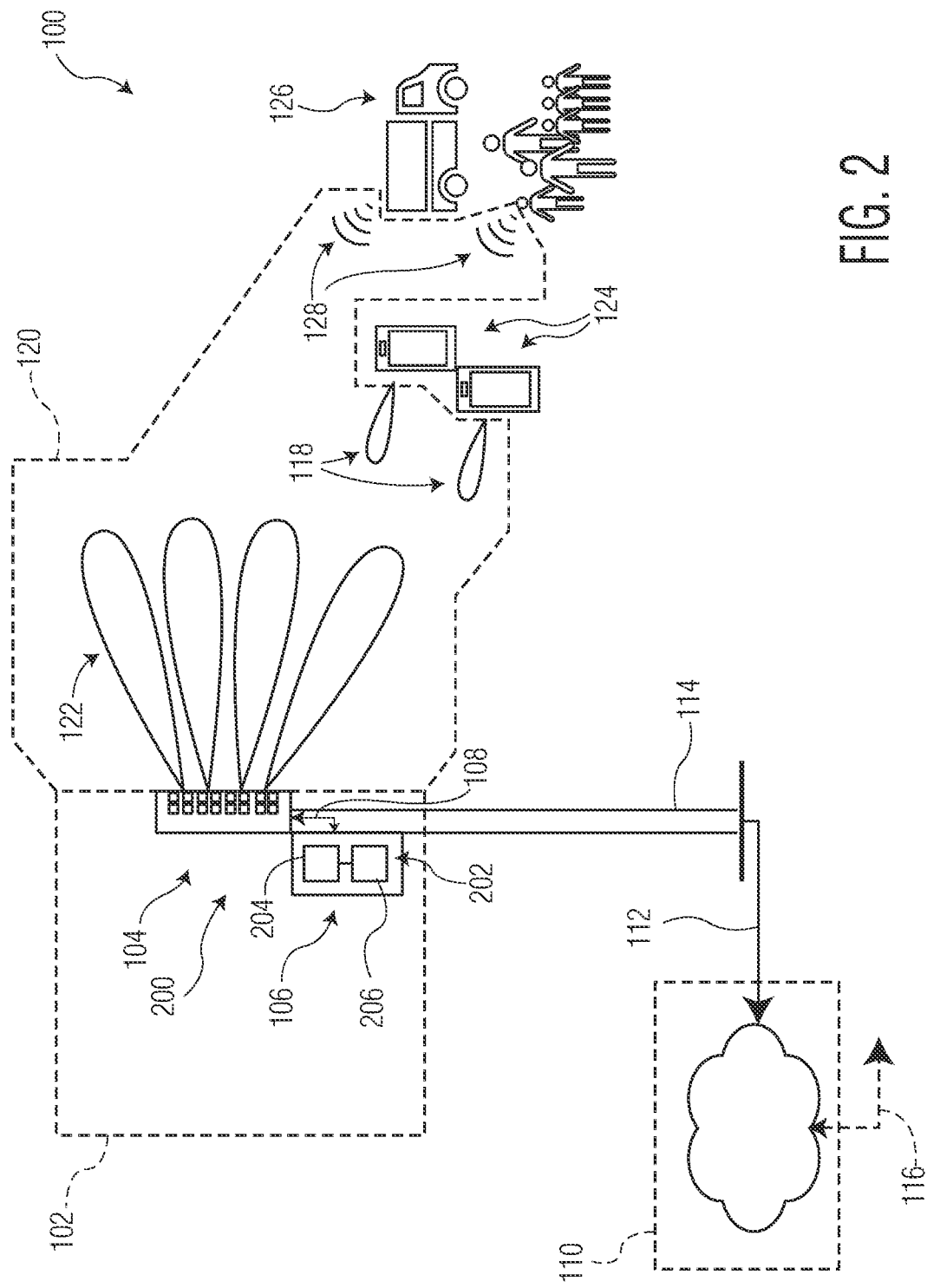
FIG. 2 is a block diagram of one embodiment of a radar localization system of the present technology incorporated into a base station of a wireless communication system, shown in relation to environmental objects/external devices in regard to which the base station may be in communication or performing radar localization.

In some examples, radar localization systems of the present technology may be incorporated into wireless communication systems, and particularly into base stations of such systems that are configured to perform both wireless communications and radar sensing in combination. FIG. 2 illustrates one embodiment of a wireless communication system 100 that has a base station 102 that includes a radar localization system 200 of the present technology, shown in relation to environmental objects/external devices in regard to which the base station may be in communication or performing radar localization.

As shown, the wireless communication system 100 includes at least one base station (BS), which is shown as a first base station 102. The first base station 102 includes at least one antenna device 104. Each antenna device 104 may be a radar sensor of the radar localization system 200, and may include the same components as the radar sensor 18 of FIG. 1. Each antenna device 104 may be an antenna in package (AiP) device. In at least some examples, the first base station 102 may include multiple antenna devices 104. Additionally, the first base station 102 also includes a control unit 106 that serves as a controller for the base station 102. A computing unit 202 of the radar localization system 200 may be included in the control unit 106, as shown in FIG. 2. Alternatively, the computing unit 202 of the radar localization system 200 may be provided in any suitable manner and be coupled at least indirectly to the radar sensor. For example, the computing unit 202 of the radar localization system 200 may be included in a ground unit, which may be coupled at least indirectly to one or more base stations. Alternatively, the computing unit 202 of the radar localization system 200 may be provided remotely of the base station 102, and may be located in the cloud backend 110.

The computing unit 202 of the radar localization system 200 includes at least one processor 204, and at least one memory device 206 coupled at least indirectly to the at least one processor 204. The at least one memory device 206 is a non-volatile memory storage device that stores computer readable instructions that, when implemented by the at least one processor 204, cause the at least one processor 204 to perform radar localization using a method of the present technology (described more fully below). The control unit 106 is coupled at least indirectly to the at least one antenna device 104, within the base station 102, by way of one or more communication links 108 that may be wired or wireless communication links.

The wireless communication system 100 may also include a cloud backend 110 that may be remotely located apart from the base station 102. In such examples, the base station 102 is coupled at least indirectly to the cloud backend 110 by way of one or more communication links 112 that may be wired or wireless communication links. In the illustrated example, the base station 102 is supported upon (and/or may be understood as including) a support structure 114, which may for example take the form of a pole or building. The communication links 112, particularly when wired, may extend from the control unit 106 to the cloud backend 110 via the support structure 114, although the communication links need not extend along the support structure 114 in other embodiments. The cloud backend 110 may have any suitable form, and, for example, may include a plurality of computer processors and storage devices. As represented by one or more additional communication links 116, the cloud backend 110 may also be coupled at least indirectly to one or more other base stations or other devices (not shown). Accordingly, the cloud backend 110 may pass communications between base stations, or perform monitoring of, as well as control of, multiple base stations including the base station 102.

The wireless communication system 100 may also include a radio frequency (RF) interface 120 by which the base station 102 both conducts wireless communications and performs radar sensing. The RF interface 120 may include the wireless or electromagnetic fields or signals by which the base station 102 is in communication or contact with other devices, structures, or objects as described further below. Although the term RF interface 120 is utilized herein, the interface provided by such wireless or electromagnetic fields or signals may alternatively be referred to by other terms such as, for example, an antenna interface, or further for example, an air (or air gap) interface when the wireless or electromagnetic fields or signals are transmitted through the air or atmosphere (it should be appreciated that such fields or signals may also be transmitted within other physical environments or by way of other media or also transmitted through a vacuum). Among other things, in the illustrated embodiment, the RF interface 120 includes electromagnetic beams 122 that are generated by the at least one antenna device 104. While four of electromagnetic beams 122 are illustrated in FIG. 1, it should be understood that, depending upon the embodiment, any one or more electromagnetic beams may be generated and often many more than four electromagnetic beams may be generated by the at least one antenna device 104. In some embodiments, such as the illustrated embodiment, in which there are multiple ones of the electromagnetic beams 122, one or more of those electromagnetic beams 122 may be utilized for communication purposes simultaneously (or substantially simultaneously) while one or more others of those electromagnetic beams may be used for radar sensing purposes.

In the illustrated example, the electromagnetic beams 122 of the wireless communication system 100 are used both to achieve wireless communications with other communication devices 124 such as mobile devices, and also to conduct radar sensing to detect or sense the presence of environmental objects 126, any of which may be stationary or moving with respect to the environmental area within the field of view of the base station 102. The other communication devices 124 as illustrated are intended to be representative of any of a variety of different types of mobile devices or other wireless communication devices including, for example, mobile phones, cellular phones, or laptop computers. The other communication devices 124 may be held by, or associated with, end users, and may thus be considered to be end user devices or considered to be representative of end users themselves. The environmental objects 126 may include any of a variety of devices, systems, apparatuses, or objects with which the base station 102 does not engage, or is not presently engaging, in wireless communications. The environmental objects 126 for example may include both inanimate objects, such as buildings or vehicles, and animate objects, such as people, animals, or vegetation such as bushes or trees.

With respect to wireless communications between the base station 102 and the other communication devices 124, it should be recognized that such wireless communications may include both transmissions from the base station 102 to the other communication devices 124, as represented by the outgoing electromagnetic beams 122, as well as transmissions from the other communication devices back to the base station 102, which are illustrated in FIG. 2 as returning electromagnetic beams 118. That is, the other communication devices 124 are active targets that send transmissions to the base station 102, in addition to receiving the outgoing transmissions sent by the base station 102. The transmissions from the base station 102 to the other communication devices 124 may be referred to as downlink (DL) communications and the transmissions from the other communication devices 124 back to the base station 102 may be referred to as uplink (UL) communications. It should be appreciated that the RF interface 120, in addition to including the electromagnetic beams 122, also may be considered to include the additional electromagnetic beams 118.

With respect to radar sensing performed by the base station 102, the environmental objects 126 are passive targets that do not generate their own transmissions, but reflect sensing signals sent by the base station 102. Accordingly, radar sensing by the base station 102 includes both the sending of electromagnetic sensing beams from the at least one antenna device 104 outward from the base station 102, as represented by the outgoing electromagnetic beams 122, toward the environmental objects 126, and the receiving of reflections of those sensing signals back from the environmental objects 126. The reflected sensing signals that reflect off the environmental objects 126 and are received by the at least one antenna device 104 are illustrated in FIG. 2 as reflected sensing signals 128, which may also be considered to form part of the RF interface 120.

In practice, the at least one antenna device 104 generates and transmits successive sets of electromagnetic beams 122 outwardly from the at least one antenna device 104, and receives back sets of reflected sensing signals 128. Each set of reflected sensing signals 128 that reflect off the environmental objects and are received by the at least one antenna device 104 may be considered one radar measurement. The at least one antenna device 104 provides data from each radar measurement to the computing unit 202, which uses the data to perform radar localization to determine the location of one or more environmental objects. When an environmental object is moving, the computing unit 202 may perform radar localization to determine the location of the environmental object using first data from a first radar measurement and second data from a second radar measurement.

In some embodiments, the RF interface 120, other communication devices 124, environmental objects 126, and cloud backend 110 may all constitute parts of the wireless communication system 100 in addition to the base station 102 that includes the radar localization system 200, as well as one or more other base stations with which the cloud backend 100 is also in communication. However, it should be appreciated that the extent of the wireless communication system 100 may be defined differently depending upon the embodiment or circumstances.

Figure 3:
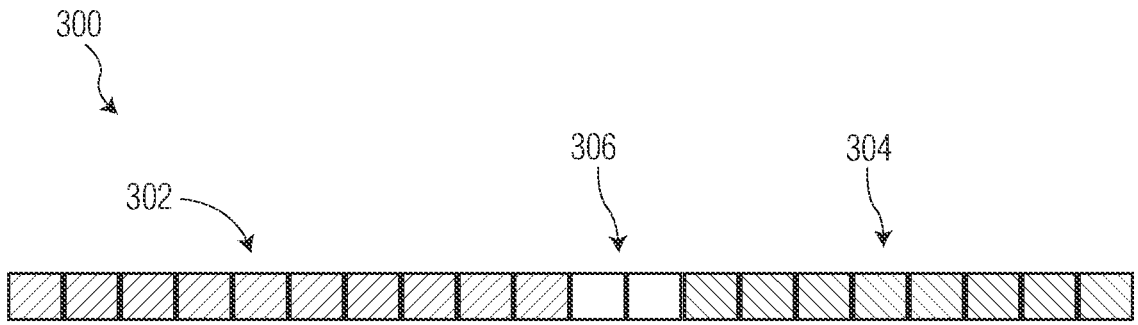
FIG. 3 illustrates one example of performing wireless communications and radar sensing in an interleaved manner.

In at least some examples, systems of the present technology, such as wireless communication system 100, may perform wireless communications and radar sensing in an interleaved manner, such as a time-division-duplex (TDD) manner, a time multiplexed manner, a frequency multiplexed manner, or a spatially multiplexed manner. For example, multiple wireless communication operations and radar sensing operations may be assigned to be performed during respective time periods within slots, referred to as symbols. One example of a TDD slot 300 is shown in FIG. 3, with each symbol being represented by a box in the TDD slot 300. As shown, a first portion 302 of the symbols is apportioned for downlink communications, a second portion 304 of the symbols is apportioned for uplink communications, and a third portion 306 of the symbols is interleaved between the first portion 302 and the second portion 306, and is apportioned for radar sensing. Time multiplexing may be accomplished in any suitable manner, such as by interleaving communication functionality and sensing functionality on a sub-frame level, such as described in European Patent Application No. 21306455.3, filed on Oct. 18, 2021, which is hereby incorporated by reference herein. The various symbols that are assigned for wireless communication operations and radar sensing operations may be combined in a structured manner, and may be distributed in a variety of different manners. Time-multiplexed approaches allow for wireless communication symbols and radar sensing symbols, and corresponding wireless communication operations and radar sensing operations, to be dedicated to particular time periods and performed in a flexible manner, so as to fulfill different use case requirements and communication requirements. Additionally, time-multiplexed approaches also allow for flexible modification of the duty cycle of radar sensing and wireless communication operations and thereby enables telecommunications providers to trade off excess communication bandwidth with increased sensing capabilities.

In systems of the present technology, one consideration in the design of radar sensing slots should be the achievement of sufficient resolution in radar sensing data (which includes range and Doppler measurement, and may also include direction of arrival (DoA)) to resolve the location of an object within a very small range of area, such as the location of a vehicle across multiple lanes in a street. Another consideration is providing sufficient support for fast processing updates, which may assist in providing accurate radar localization of moving objects in real time.

Figure 4:
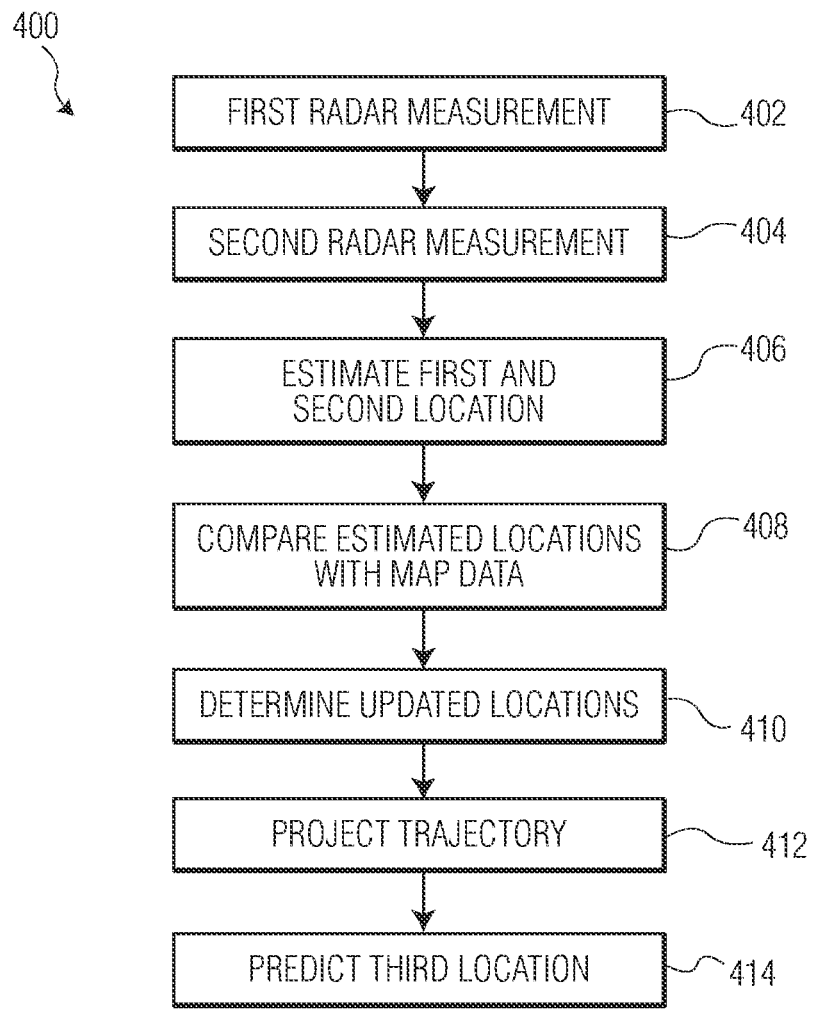
FIG. 4 is flow diagram of one embodiment of a method of radar localization of the present technology.

FIG. 4 illustrates one example of a radar localization method 400 that can be used to determine the location of an object. The radar localization method 400 may start at step 402, which includes receiving by a computing unit, such as computing unit 12 or 202, first data from a first radar measurement of an object at a first time. Method step 402 may also include taking the first radar measurement by at least one radar sensor, and providing the first data from the receiver of the radar sensor to the computing unit. The first data includes a first range and a first Doppler measurement with respect to the object. In some examples, the first data may also include a first direction of arrival with respect to the object.

The method may proceed to step 404, which includes receiving, by the computing unit, second data from a second radar measurement of an object at a second time. Method step 404 may also include taking the second radar measurement by at least one radar sensor, and providing the second data from the receiver of the radar sensor to the computing unit. The second data includes a second range and a second Doppler measurement with respect to the object. In some examples, the second data may also include a second direction of arrival with respect to the object.

The method may proceed to step 406, which includes determining by the computing unit at least one estimated first position of the object at the first time and at least one estimated second position of the object at the second time. The estimated first and second positions of the object are determined based on the first and second data. For example, the first range and, when available, the first direction of arrival information, may be used in determining the at least one estimated first position. Likewise, the second range and, when available, the second direction of arrival information, may be used in determining at least one estimated second position. It will be appreciated that, in at least some circumstances, given the limited information of the first and second radar measurements, there may be more than one possible first position and second position. Range information for an object based on an omnidirectional radar measurement, for example, would result in it being possible for the object to be at any point on a circle around the radar sensor having a radius equal to the range. Accordingly, the at least one estimated first position and the at least one estimated second position may each include one or more, or even a range of, possible locations. When direction of arrival information is available, location estimates may be improved to provide higher accuracy, and thus narrow the range of possible locations for the at least one estimated first position and the at least one estimated second position. Additionally, while step 406 is illustrated as occurring after step 404, it should be understood that the portion of step 406 that includes determining at least one estimated first position of the object at the first time may occur before step 404.

The method may proceed to step 408, which includes comparing by the computing unit the at least one estimated first position of the object and the at least one estimated second position of the object with map data. In at least one example, the map data may be stored on the at least one memory device of the computing unit, such as memory device 16 or 206. In other examples, the map data may be accessed by the computing unit from a source external to the computing unit. The map data may be high definition and three-dimensional map data, and may include geographical features of the environmental area in which the radar localization system is located, such as location and boundary information related to any streets and preferably also the lanes of any streets, sidewalks, buildings, trees, and other geographical features. The map data may be generated in any suitable manner. For examples, the map data may be generated by radar sensing data collection for large periods of time to determine definitions of landscape topology and geometry, such as street lanes, or may be modelled with three-dimensional (3D) coordinates, or may be generated by any other suitable mapping infrastructure.

The method may proceed to step 410, which includes determining by the computing unit an updated first position of the object and an updated second position of the object based on the map data, the at least one estimated first position of the object and the at least one estimated second position of the object. The step of determining the updated first and second positions of the object may include eliminating any estimated locations that are not feasible based on the map data. For example, if the map data shows a building blocking any of the estimated locations, step 410 may include eliminating any estimated locations that are inside the building. In examples where radar localization is being performed to locate a moving vehicle, step 410 may include eliminating any estimated locations that are outside of the boundaries of a street shown by the map data. While step 410 is illustrated as occurring after step 408, it should be understood that the portion of steps 406, 408 and 410 related to the first position may occur prior to step 404, or at any time thereafter prior to step 412.

In some examples, the method 400 may also include step 412, which includes projecting by the computing unit a trajectory of the object. As used herein, the term "projecting" signifies determining the predicted path of the object, which may be drawn as a path extending from the object at a given time that represents where the object is expected to travel within the next one or more increments of time. The trajectory of the object includes the direction and velocity of the object, and may be drawn as a vector. The trajectory of the object may be projected based at least in part on the updated first position of the object and the updated second position. The trajectory may also be projected based in part on direction of travel and velocity information derived from the Doppler measurement information, and in some examples also the direction of arrival information, derived from the first data from the first radar measurement and the second data from the second radar measurement. Further, the trajectory may be projected based in part on the map data. For example, a projected trajectory may be determined by drawing a line starting at the first updated location and extending through the second updated location. However, if the line of the projected trajectory extends into locations that are not feasible based on the map data, the computing unit may adjust the initial projected trajectory and provide an adjusted projected trajectory that does not include non-feasible locations.

In some examples, the method 400 may also include step 414, which includes predicting by the computing unit a third location of the object at a third time. The computing unit may predict the third location by calculating the distance along the projected trajectory that the object is expected to travel between the second time and the third time. Such a prediction may be based in part on an assumption that the velocity of the object will remain the same as the velocity included in the projected trajectory. Predicting the third location may also include determining an initial predicted third location, comparing the initial predicted third location to the map data, and generating an adjusted predicted third location by adjusting the initial predicted third location based on the map data to avoid predicting that third location will be in a non-feasible location. In examples where the object is a moving vehicle, for example, the predicted third location may be adjusted based on assumptions that the vehicle will remain in its lane, and not go off the road or into a different lane.

Figure 5:
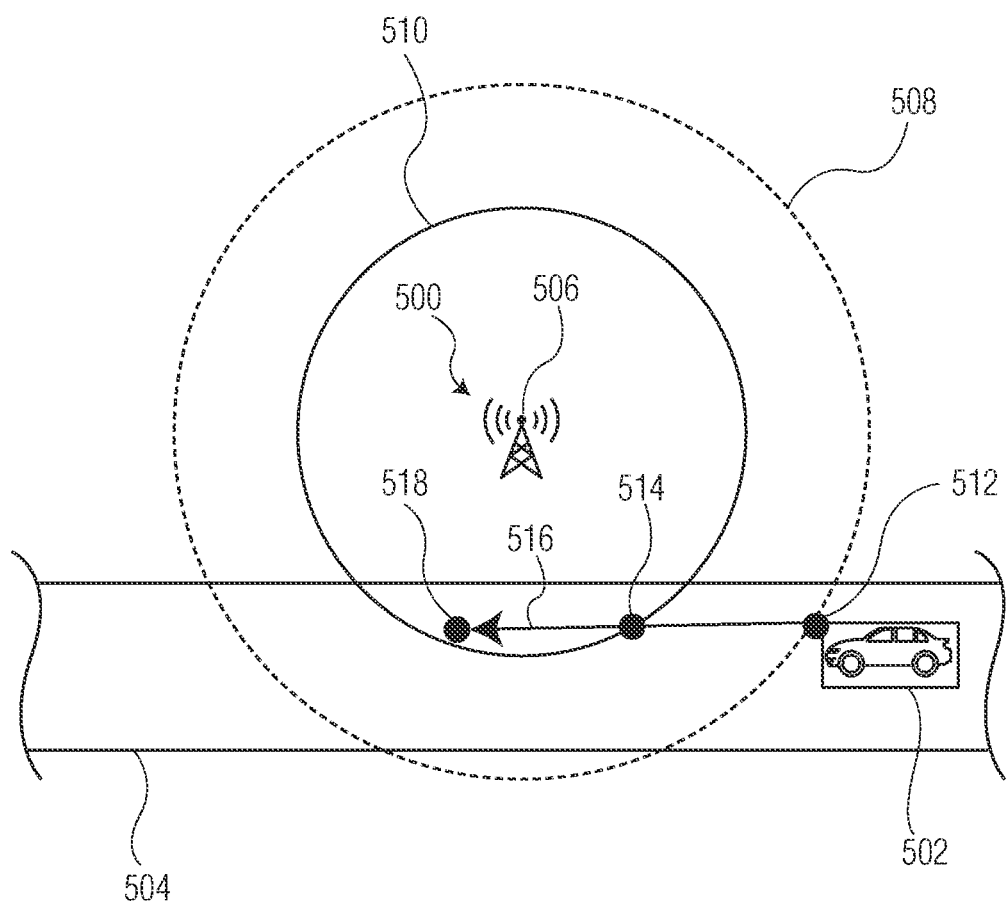
FIG. 5 illustrates a two-dimensional example of one implementation of the radar localization method of FIG. 4 for vehicle localization.

FIG. 5 illustrates an example of one implementation of the radar localization method 400 for localization of an object that is a moving vehicle, in two dimensions. As shown in FIG. 5, a radar localization system 500 is performing a method of radar localization with respect to a vehicle 502 that is traveling on a street 504. While the examples discussed herein are in the context of a vehicle on a street, it should be understood that the localization systems and methods of the present technology can be used in any setting, whether indoors or outdoors. For example, localization systems and methods of the present technology can be used in indoor settings, such as warehouses, that have aisles and ramps on which an object may move.

The radar localization system 500 may be a system such as radar localization system 10 of FIG. 1 or radar localization system 200 of FIG. 2 that is incorporated into a base station 102 of a wireless communications system 100. As shown, the radar localization system 500 includes at least one radar sensor 506 that performs radar measurements.

The radar sensor 506 takes a first radar measurement of the vehicle 502 at a first time, and first data from the first radar measurement is provided from the radar sensor 506 to the computing unit (not shown) of the radar localization system 500. The first data includes a first range and a first Doppler measurement with respect to the vehicle 502 and may also include a first direction of arrival with respect to the vehicle 502.

The radar sensor 506 takes a second radar measurement of the vehicle 502 at a second time, and second data from the second radar measurement is provided from the radar sensor 506 to the computing unit (not shown) of the radar localization system 500. The second data includes a second range and a second Doppler measurement with respect to the vehicle 502 and may also include a second direction of arrival with respect to the vehicle 502.

The computing unit of the radar localization system 500 may determine at least one estimated first position of the vehicle 502 at the first time and at least one estimated second position of the vehicle 502 at a second time. The estimated first and second positions of the vehicle 502 are determined based on the first and second data. For example, based on the first range alone, the estimated first position of the vehicle 502 at the first time may include all of the points on a first circle 508. Information obtained from the radar measurement, such as velocity and direction of travel, as well as direction of arrival information when available, may be used to more accurately determine the estimated first position of the vehicle 502. Likewise, based on the second range alone, the estimated second position of the vehicle 502 at the second time may include all of the points on a second circle 510. Information obtained from the radar measurement, such as velocity and direction of travel, as well as direction of arrival information when available, may be used to more accurately determine the estimated second position of the vehicle 502. Accordingly, the at least one estimated first position and the at least one estimated second position may each include one or more, or even a range of, possible locations.

The computing unit of the radar localization system 500 may include or access map data, and may compare the at least one estimated first position of the vehicle 502 and the at least one estimated second position of the vehicle 502 with map data. The map data may be stored on the at least one memory device of the computing unit, such as memory device 16 (FIG. 1) or 206 (FIG. 2). In other examples, the map data may be accessed by the computing unit from a source external to the computing unit. The map data may be high definition and three-dimensional map data, and may include geographical features of the environmental area in which the radar localization system is located, such as location and boundary information related to the street 504, and preferably also the location and boundary information related to any lanes of the street 504.

The computing unit of the radar localization system 500 may determine an updated first position 512 of the vehicle 502 and an updated second position of the vehicle 514 based on the map data, the at least one estimated first position of the vehicle 502 and the at least one estimated second position of the vehicle 502. The determination of the updated first position and updated second position of the vehicle 502 may include eliminating any estimated locations that are not feasible based on the map data. In the illustrated example, examples of locations that are not feasible may be as any points on the first circle 508 and the second circle 510 that are not located within the boundaries of the street 504. In examples that occur in other settings, locations that are not feasible may be defined by other parameters, such areas occupied by shelves or other obstacles and objects.

The computing unit of the radar localization system 500 may determine a projected trajectory 516 of the vehicle 502. The trajectory of the vehicle 502 includes the direction and velocity of the vehicle 502. The projected trajectory 516 of the vehicle 502 may be projected based at least in part on the updated first position of the vehicle 502 and the updated second position. The projected trajectory 516 may also be projected based in part on direction of travel and velocity information derived from the Doppler measurement information, and in some examples also the direction of arrival information, derived from the first data from the first radar measurement and the second data from the second radar measurement. Further, the projected trajectory 516 may be projected based in part on the map data. As shown in the illustrated example of FIG. 5, the projected trajectory 516 may be determined by drawing a line starting at the first updated location and extending through the second updated location.

The computing unit of the radar localization system 500 may predict a third location 518 of the vehicle 502 at a third time. The predicted third location 518 may be predicted by calculating the distance along the projected trajectory that the vehicle 502 is expected to travel between the second time and the third time. Such a prediction may be based in part on an assumption that the velocity of the vehicle 502 will remain the same as the velocity included in the projected trajectory 516. Predicting the third location may also include determining an initial predicted third location, comparing the initial predicted third location to the map data, and generating an adjusted predicted third location by adjusting the initial predicted third location based on the map data to avoid predicting that the third location will be in a non-feasible location. In the illustrated example, the predicted third location may be adjusted based on assumptions that the vehicle will remain within the boundaries of its lane, and/or that the vehicle 502 will remain on the street 504.

Figure 6:
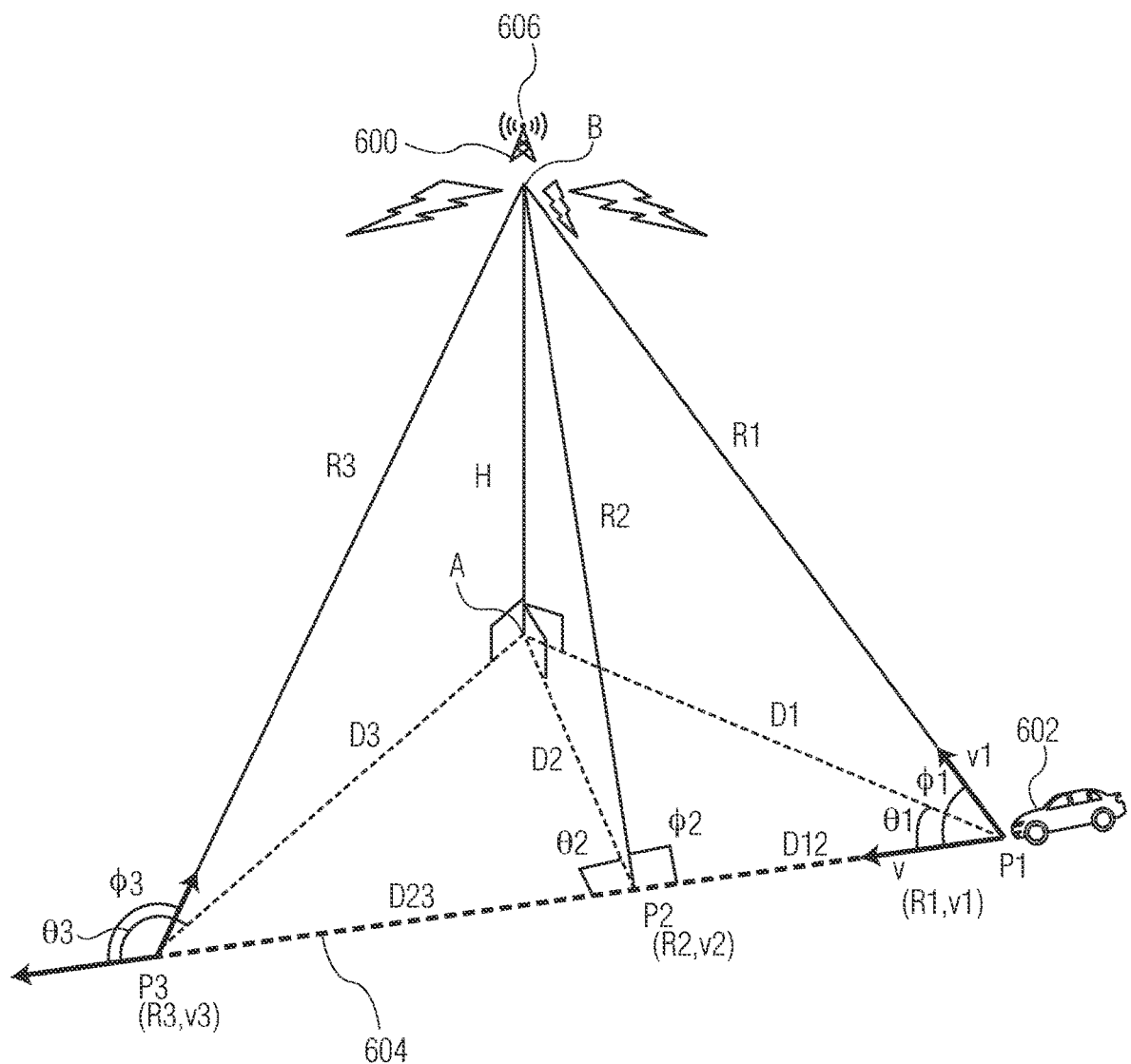
FIG. 6 illustrates a three-dimensional example of one implementation of the radar localization method of FIG. 4 for vehicle localization.

FIG. 6 illustrates an example of one implementation of the radar localization method 400 for localization of an object that is a moving vehicle, in three dimensions. As shown in FIG. 6, a radar localization system 600 is performing a method of radar localization with respect to a vehicle 602 that is traveling along a path 604 on a street (not shown). The radar localization system 600 may be a system such as radar localization system 10 of FIG. 1 or radar localization system 200 of FIG. 2 that is incorporated into a base station 102 of a wireless communications system 100. As shown, the radar localization system 600 includes at least one radar sensor 606 that performs radar measurements. In this example, the radar localization system is located a height H off the ground. For purposes of this discussion, the point A on the ground level under the radar localization system 600 may be considered to be the origin point having coordinates (0,0,0). In this example, the radar localization system 600 (and the radar sensor 606 are at point B, which has coordinates (0, 0, H).

The radar sensor 606 takes a first radar measurement of the vehicle 602 at a first time, and first data from the first radar measurement is provided from the radar sensor 606 to the computing unit (not shown) of the radar localization system 600. The first data includes a first range R1 and a first Doppler measurement with respect to the vehicle 602 and may also include a first direction of arrival with respect to the vehicle 602.

The radar sensor 606 takes a second radar measurement of the vehicle 602 at a second time, and second data from the first radar measurement is provided from the radar sensor 606 to the computing unit (not shown) of the radar localization system 600. The second data includes a second range R2 and a second Doppler measurement with respect to the vehicle 602 and may also include a second direction of arrival with respect to the vehicle 602.

The computing unit of the radar localization system 600 may determine at least one estimated first position of the vehicle 602 at the first time and at least one estimated second position of the vehicle 602 at a second time. The estimated first and second positions of the vehicle 602 are determined based on the first and second data.

With respect to the first data from the first radar measurement, the computing unit of the radar localization system 600 may compute a distance measurement D1, representing the distance between the origin point (A) and the location of the vehicle 602 when it is at the first position, based on the known height H and the first range R1. The computing unit of the radar localization system 600 may compare the at least one estimated first position of the vehicle 602 with map data, and may determine an updated first position P1 of the vehicle 602 based on the at least one estimated first position and the map data.

The computing unit of the radar localization system 600 may estimate the velocity of the vehicle at the first time. In one example, the radar localization system 600 may estimate at least a first velocity component v1 directed in the direction of the base station along the first range R1. Additionally, the radar localization system 600 may use map data to estimate a second velocity component v of the vehicle in the direction of the street. In at least one example, the computing unit of the radar localization system may compute the distance D12 that the vehicle is expected to travel during the time between the first radar measurement and the second radar measurement using the estimated velocity at the first time, and may calculate a predicted second position of the vehicle at the second time.

With respect to the second data from the second radar measurement, the computing unit of the radar localization system 600 may compute a distance measurement D2, representing the distance between the origin point (A) and the location of the vehicle 602 when it is at the second position, based on the known height H and the second range R2. The computing unit of the radar localization system 600 may compare the at least one estimated second position of the vehicle 602 with map data, and may determine an updated second position P2 of the vehicle 602 based on the at least one estimated second position and the map data. In examples where the radar localization system calculates a predicted second position of the vehicle, the predicted second position can be verified if it matches the updated second position P2.

Over small measurement periods, such as those that may be used in methods of the present technology, the vehicle velocity may be assumed to be constant. Accordingly, the computing unit of the radar localization system 600 may determine a projected trajectory of the vehicle 602. The trajectory of the vehicle 602 includes the direction and velocity of the vehicle 602. The projected trajectory of the vehicle 502 may be projected based at least in part on the updated first position of the vehicle 602 and the updated second position. The projected trajectory may also be projected based in part on direction of travel and velocity information derived from the Doppler measurement information, and in some examples also the direction of arrival information, derived from the first data from the first radar measurement and the second data from the second radar measurement. Further, the projected trajectory may be projected based in part on the map data. As shown in the illustrated example of FIG. 6, the projected trajectory may be used to compute the distance D23 along the projected trajectory that the vehicle 602 is expected to travel during the time between the second radar measurement and the third radar measurement, and may calculate a predicted third position P3 of the vehicle at the third time. Predicting the third location may also include determining an initial predicted third location, comparing the initial predicted third location to the map data, and generating an adjusted predicted third location by adjusting the initial predicted third location based on the map data to avoid predicting that the third location will be in a non-feasible location. In the illustrated example, the predicted third location may be adjusted based on assumptions that the vehicle will remain within the boundaries of its lane, and/or that the vehicle 602 will remain on the street.

In practice, radar localization systems periodically make radar measurements, so the radar localization system may make a third radar measurement at a third time. The computing unit of the radar localization system 600 may receive third data from the third radar measurement. The third data may include a third range R3 and a third Doppler measurement with respect to the vehicle 602 and may also include a third direction of arrival with respect to the vehicle 602. The predicted third position P3 can thus be verified by the radar localization system 600 based on the third data from the third radar measurement and the map data. The predicted trajectory of the vehicle may also be adjusted by the radar localization system 600 based on the third data, and the verified third position P3. Additionally, when there are at least three radar measurements, the acceleration (and deceleration in the case of negative acceleration) may be determined by the computing unit of the radar localization system 600 using the data from each of the radar measurements. For example, the computing unit of the radar localization system 600 may determine the estimated velocity of the vehicle between the first location and the second location, and between the second location and the third location, and compare them to determine the estimated acceleration.

As shown in FIG. 6, various triangles may be formed between the points B, A, P1, P2, and P3. Triangle geometry may be used in one or more of the calculations performed by the radar localization system 600. For example, triangle P1AP2 is in the plane of the ground (assuming flat ground), and has legs D1, D2 and D12. Angle θ1 is between D1 and D12. Triangle P1BP2 has legs R1, R2, and D12. Angle φ1 is between R1 and D12, and angle φ2 (shown as being a right angle in this example) between R2 and D12. Triangle P2AP3 has legs D2, D3, and D23. The angle θ2 (shown as being a right angle in this example) is between D2 and D23. The angle θ3, in the plane of the ground between D3 and the extension of path 604 beyond P3, may be determined based on triangle P2AP3. Additionally, angle φ3, which is between R3 and the extension of path 604 beyond P3, may be determined using triangle P2BP3.

NUMERICAL EXAMPLE

Figure 7:
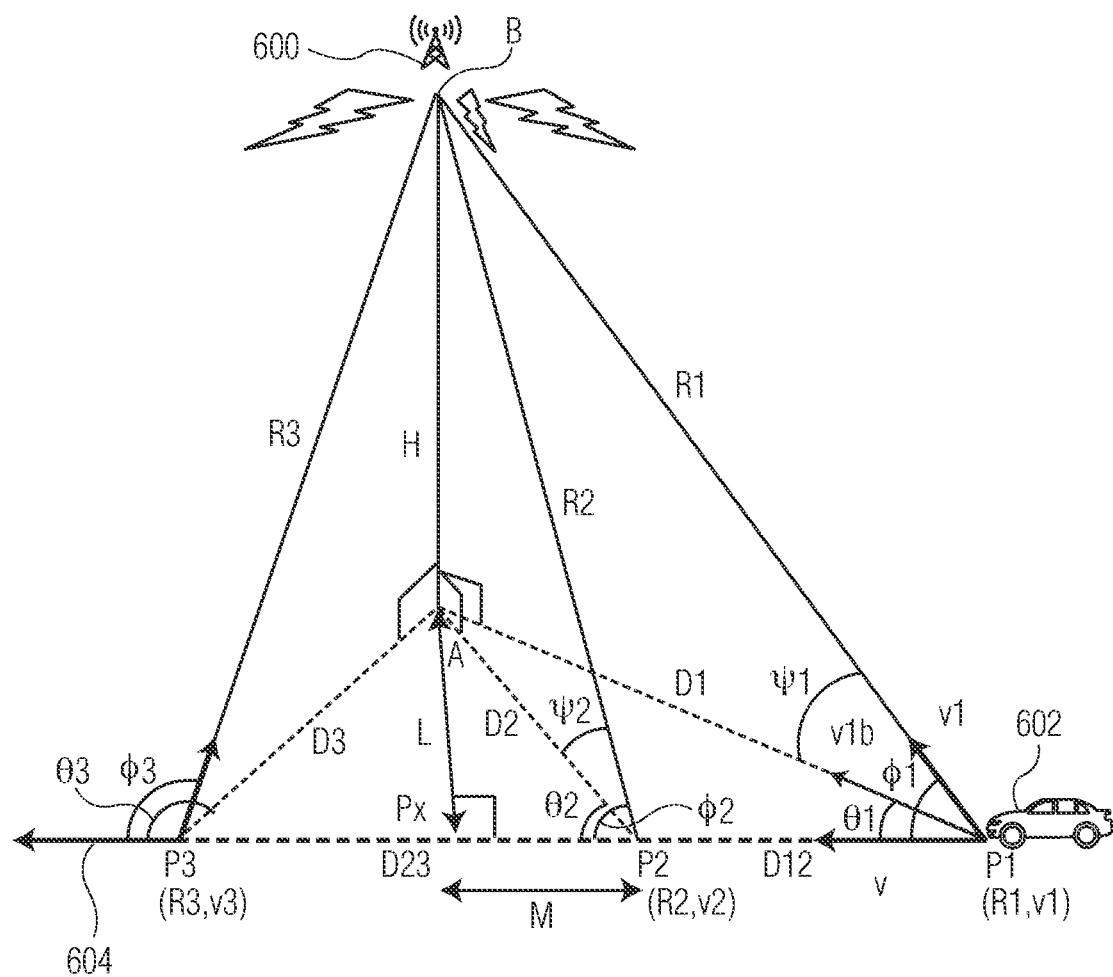
FIG. 7 illustrates an additional three-dimensional example of one implementation of the radar localization method of FIG. 4 for vehicle localization.

FIG. 7 illustrates a revised version of FIG. 6, with additional information used in the following numerical example of calculations that may be made as part of a radar localization method of the present technology, such as radar localization method 400. The units discussed in this example are in meters and seconds. Just as in FIG. 6, FIG. 7 shows the radar localization system 600 is performing a method of radar localization with respect to a vehicle 602 that is traveling along a path 604 on a street (not shown). As shown, point B is the point at which the radar localization system 600 is located and has coordinates (0,0,10), point A is the origin point at ground level under the radar localization system 600 and has coordinates (0,0,0). The vehicle 602 is shown in the present example to be positioned at a first position having coordinates (50,10,0).

In this example, the first data from the first radar measurement provides a first range R1 to be 51.96 m, and a first velocity component measurement v1=5.196 m/s. Given that information, the computing unit of the radar localization system 600 can make the following determinations:

in triangle BAP1, and a velocity component v1b, which represents the component of the velocity along D1. FIG. 7 further includes angle Ψ2, which is the angle of triangle BAP2 between R2 and D2.

In practice, radar localization methods of the present technology use multiple measurements when determining the vehicle path. Example calculations are shown in Tables A and B below for different choices of speed and distances between the radar localization system 600 and the street:

TABLE A

| No. | H | L | P | R1 | D1 | v | cos(theta1) | cos(psi1) |
|---|---|---|---|---|---|---|---|---|
| 1 | 10 | 10 | 50 | 51.96152 | 50.9902 | 5 | 0.980581 | 0.981307 |
| 2 | 10 | 40 | 50 | 64.80741 | 64.03124 | 5 | 0.780869 | 0.988024 |
| 3 | 10 | 10 | 50 | 51.96152 | 50.9902 | 25 | 0.980581 | 0.981307 |
| 4 | 10 | 40 | 50 | 64.80741 | 64.03124 | 25 | 0.780869 | 0.988024 |

TABLE B

| No. | v1b | v1 | T | P2 | R2 | P3 | R3 | D2 |
|---|---|---|---|---|---|---|---|---|
| 1 | 5.09902 | 5.196152 | 0.1 | 49.5 | 51.48058 | 49 | 51 | 50.5 |
| 2 | 6.403124 | 6.480741 | 0.1 | 49.5 | 64.42243 | 49 | 64.03905 | 63.64157 |
| 3 | 25.4951 | 25.98076 | 0.1 | 47.5 | 49.56057 | 45 | 47.16991 | 48.54122 |
| 4 | 32.01562 | 32.4037 | 0.1 | 47.5 | 62.89873 | 45 | 61.03278 | 62.09871 |

D1=50.99 m
v1b=5.196*50.99/51.96=5.099 m/s.
L=10 m.
v=5.099*50/51.03=5 m/s.
D12=5*0.1=0.5 m (assuming radar measurements are conducted at 0.1 s intervals).

The radar localization system may predict the second position to have coordinates (49.5, 10, 0) based on those determinations. The predicted second position can be verified if the updated second position P2 determined based on the second data from the second radar measurement also has coordinates (49.5, 10, 0).

Based on the updated first position P1, the updated second position P2 and the map data, the radar localization system 600 may determine a projected trajectory of the vehicle 602. The trajectory of the vehicle 602 includes the direction and velocity of the vehicle 602 (which has been determined to be 5 m/s). As shown in the example of FIG. 7, the projected trajectory may be used to compute the distance D23 along the projected trajectory that the vehicle 602 is expected to travel during the time between the second radar measurement and the third radar measurement, and may calculate a predicted third position P3 of the vehicle at the third time. The predicted third position P3 in this example has coordinates (49, 10, 0). If the vehicle 602 is then determined to be at P3 (49,10,0), based on the range estimation R3 in the third data from a third radar measurement, then the past updated positions P1, P2 can be validated.

The various triangles that may be formed between the points B, A, P1, P2, and P3 as shown in FIG. 7 are similar to the triangles shown and discussion with respect to FIG. 6, and the similar components have like labels. In the example shown in FIG. 7, however, angles φ2 and θ2 are not shown as being right angles. Instead, a right triangle may be formed in the plane of the ground, by the points P1APx, where point Px is the estimated position of the vehicle 602 at a time x, L is the length (or distance) between points A and Px, and M is the distance between points P2 and Px. FIG. 7 also includes angle Ψ1, which is the angle between R1 and D1

Notwithstanding the above description, the present disclosure is intended to encompass numerous embodiments including those disclosed herein as well as a variety of alternate embodiments.

Further, in at least some examples encompassed herein, the present disclosure relates to radar localization systems and methods.

In at least some examples, a method of radar localization using a radar localization system is provided. The method includes receiving by a computing unit first data from a first radar measurement of an object at a first time, the first data including a first range and a first Doppler measurement. The method also includes receiving by the computing unit second data from a second radar measurement of an object at a second time, the second data including a second range and a second Doppler measurement. In some examples, the first data may also include first direction of arrival information, and the second data may also include second direction of arrival information. The method also includes determining by the computing unit at least one estimated first position of the object at the first time, and at least one estimated second position of the object at a second time. The method also includes comparing by the computing unit the at least one estimated first position of the object and the at least one estimated second position of the object with map data. In some examples, the map data may include geographical features of an environmental area in which the radar localization system is located, including location and boundary information related to any streets within the environmental area. The method further includes determining by the computing unit an updated first position of the object and an updated second position of the object based on the map data, the at least one estimated first position of the object and the at least one estimated second position of the object. In some examples, the step of determining by the computing unit an updated first position of the object and an updated second position of the object based on the map data includes eliminating any estimated locations that are not feasible based on the map data.

Additionally, in some examples, the method may further include projecting by the computing unit a projected trajectory of the object, wherein the projected trajectory includes a direction and a velocity of the object. Projecting the trajectory may be based at least in part on the updated first position of the object and the updated second position of the object. Projecting the trajectory may also be based at least in part on direction of travel and velocity information derived from the first Doppler measurement in the first data and the second Doppler measurement in the second data. Projecting the trajectory may further be based at least in part on the map data.

In some examples, the method may also further include predicting by the computing unit a third location of the object at a third time based at least in part on the projected trajectory of the object. In some such examples, predicting the third location may include calculating by the computing unit a distance along the projected trajectory that the object is expected to travel between the second time and the third time. In at least one example, predicting the third location may include determining an initial predicted third location, comparing the initial predicted third location to the map data, and generating an adjusted predicted third location by adjusting the initial predicted third location based on the map data.

In some examples, a radar localization system is provided that comprises a computing unit including at least one processor and at least one memory device coupled at least indirectly to the at least one processor. In some examples of a radar localization system, the system may also include at least one radar sensor that includes a transmitter, a receiver, and an antenna. The at least one memory device may be a non-volatile memory storage device that stores computer readable instructions that, when implemented by the at least one processor, cause the at least one processor to perform radar localization by:

receiving by a computing unit first data from a first radar measurement of an object at a first time, the first data including a first range and a first Doppler measurement;

receiving by the computing unit second data from a second radar measurement of an object at a second time, the second data including a second range and a second Doppler measurement;

determining by the computing unit at least one estimated first position of the object at the first time, and at least one estimated second position of the object at the second time;

comparing by the computing unit the at least one estimated first position of the object and the at least one estimated second position of the object with map data; and determining by the computing unit an updated first position of the object and an updated second position of the object based on the map data, the at least one estimated first position of the object, and the at least one estimated second position of the object.

In some examples of a radar localization system, the first data may also include first direction of arrival information, and the second data may also include second direction of arrival information.

In some examples, a radar localization system may further comprise a base station that includes at least one antenna device and at least one base station control unit coupled at least indirectly to the at least one antenna device. In such examples, the at least one antenna device may be the at least one radar sensor, and the base station control unit may include the computing unit. In at least one such example, the at least one antenna device may transmit electromagnetic beams for both wireless communications and radar sensing.

In further examples, wireless communication systems are provided that includes a radar localization system. Some such wireless communication systems include a base station that includes at least one antenna device and at least one base station control unit coupled at least indirectly to the at least one antenna device. In some examples, the at least one antenna device may include a transmitter, a receiver, and an antenna. Additionally, the at least one antenna device may transmit electromagnetic beams for both wireless communications and radar sensing. In some examples, the at least one antenna device is a radar sensor, and the base station control unit includes a computing unit. The computing unit may include at least one processor and at least one memory device coupled at least indirectly to the at least one processor. The at least one memory device may be a non-volatile memory storage device that stores computer readable instructions that, when implemented by the at least one processor, cause the at least one processor to perform radar localization by:

receiving by a computing unit first data from a first radar measurement of an object at a first time, the first data including a first range and a first Doppler measurement;

receiving by the computing unit second data from a second radar measurement of an object at a second time, the second data including a second range and a second Doppler measurement;

determining by the computing unit at least one estimated first position of the object at the first time, and at least one estimated second position of the object at the second time;

comparing by the computing unit the at least one estimated first position of the object and the at least one estimated second position of the object with map data; and determining by the computing unit an updated first position of the object and an updated second position of the object based on the map data, the at least one estimated first position of the object, and the at least one estimated second position of the object.

In some examples of wireless communication systems that include radar localization systems, the first data may also include first direction of arrival information, and the second data may also include second direction of arrival information.

While the principles of the invention have been described above in connection with specific apparatus, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method of radar localization using a radar localization system, the method comprising:

receiving by a computing unit first data from a first radar measurement of an object at a first time, the first data including a first range and a first Doppler measurement;

receiving by the computing unit second data from a second radar measurement of the object at a second time, the second data including a second range and a second Doppler measurement;

determining by the computing unit at least one estimated first position of the object at the first time based on a circle having a radius equal to the first range, and at least one estimated second position of the object at the second time based on a circle having a radius equal to the second range;

comparing by the computing unit the at least one estimated first position of the object and the at least one estimated second position of the object with map data; and determining by the computing unit an updated first position of the object at the first time and an updated second position of the object at the second time based on the map data, the at least one estimated first position of the object, the at least one estimated second position of the object, and eliminating any estimated locations within the first range and the second range that are not feasible based on the estimated locations being outside the boundaries of a street shown by the map data.

2. The method of radar localization of claim 1, wherein the first data also includes first direction of arrival information, and the second data includes second direction of arrival information.

3. The method of radar localization of claim 1, wherein the map data includes geographical features comprising location and boundary information related to any streets within an environmental area in which the radar localization system is located.

4. The method of radar localization of claim 1, further comprising:

projecting by the computing unit a projected trajectory of the object based at least in part on the updated first position of the object and the updated second position of the object, wherein the projected trajectory includes a direction and a velocity of the object.

5. The method of radar localization of claim 4, wherein the projected trajectory is based at least in part on direction of travel and velocity information derived from the first Doppler measurement in the first data and the second Doppler measurement in the second data.

6. The method of radar localization of claim 4, wherein the projected trajectory is based at least in part on the map data.

7. The method of radar localization of claim 4, further comprising:

predicting by the computing unit a third location of the object at a third time after the second time, based at least in part on the projected trajectory of the object.

8. The method of radar localization of claim 7, wherein the predicting of the third location includes calculating by the computing unit a distance along the projected trajectory that the object is expected to travel between the second time and the third time.

9. The method of radar localization of claim 7, wherein the predicting of the third location includes determining an initial predicted third location, comparing the initial predicted third location to the map data, and generating an adjusted predicted third location by adjusting the initial predicted third location based on the map data.

10. A radar localization system comprising:

a computing unit including at least one processor and at least one memory device coupled at least indirectly to the at least one processor;

wherein the at least one memory device is a non-volatile memory storage device that stores computer readable instructions that, when implemented by the at least one processor, cause the at least one processor to perform radar localization by:

receiving by a computing unit first data from a first radar measurement of an object at a first time, the first data including a first range and a first Doppler measurement;

receiving by the computing unit second data from a second radar measurement of the object at a second time, the second data including a second range and a second Doppler measurement;

determining by the computing unit at least one estimated first position of the object at the first time based on a circle having a radius equal to the first range, and at least one estimated second position of the object at the second time based on a circle having a radius equal to the second range;

comparing by the computing unit the at least one estimated first position of the object and the at least one estimated second position of the object with map data; and determining by the computing unit an updated first position of the object at the first time and an updated second position of the object at the second time based on the map data, the at least one estimated first position of the object, the at least one estimated second position of the object, and eliminating any estimated locations within the first range and the second range that are not feasible based on the estimated locations being outside the boundaries of a street shown by the map data.

11. The radar localization system of claim 10, wherein the first data also includes first direction of arrival information, and the second data includes second direction of arrival information.

12. The radar localization system of claim 10, further comprising at least one radar sensor that includes a transmitter, a receiver, and an antenna.

13. The radar localization system of claim 12, further comprising a base station that includes at least one antenna device and at least one base station control unit coupled at least indirectly to the at least one antenna device;

wherein the at least one antenna device is the at least one radar sensor, and the base station control unit includes the computing unit.

14. The radar localization system of claim 13, wherein the at least one antenna device transmits electromagnetic beams for both wireless communications and radar sensing.

15. A wireless communication system comprising:

a base station that includes at least one antenna device and at least one base station control unit coupled at least indirectly to the at least one antenna device;

wherein the at least one antenna device is a radar sensor, and the base station control unit includes a computing unit, the computing unit including at least one processor and at least one memory device coupled at least indirectly to the at least one processor;

wherein the at least one memory device is a non-volatile memory storage device that stores computer readable instructions that, when implemented by the at least one processor, cause the at least one processor to perform radar localization by:

receiving by a computing unit first data from a first radar measurement of an object at a first time, the first data including a first range and a first Doppler measurement;

receiving by the computing unit second data from a second radar measurement of the object at a second time, the second data including a second range and a second Doppler measurement;

determining by the computing unit at least one estimated first position of the object at the first time based on a circle having a radius equal to the first range, and at least one estimated second position of the object at the second time based on a circle having a radius equal to the second range;

comparing by the computing unit the at least one estimated first position of the object and the at least one estimated second position of the object with map data; and determining by the computing unit an updated first position of the object at the first time and an updated second position of the object at the second time based on the map data, the at least one estimated first position of the object, the at least one estimated second position of the object, and eliminating any estimated locations within the first range and the second range that are not feasible based on the estimated locations being outside the boundaries of a street shown by the map data.

16. The wireless communication system of claim 15, wherein the first data also includes first direction of arrival information, and the second data includes second direction of arrival information.

17. The wireless communication system of claim 15, wherein the at least one antenna device includes a transmitter, a receiver, and an antenna.

18. The wireless communication system of claim 15, wherein the at least one antenna device transmits electromagnetic beams for both wireless communications and radar sensing.

* * * * *